United States Patent [19]

Furukawa et al.

[11] Patent Number: 5,147,701
[45] Date of Patent: Sep. 15, 1992

[54] INFORMATION RECORDING MEDIUM

[75] Inventors: Shigeaki Furukawa, Shiki; Takeo Ohta, Nara; Tetsuya Akiyama, Moriguchi; Hidemi Isomura, Osaka, all of Japan

[73] Assignee: Matsushita Electric Industrial Co., Ltd., Osaka, Japan

[21] Appl. No.: 458,376

[22] Filed: Dec. 28, 1989

[30] Foreign Application Priority Data

Dec. 28, 1988 [JP] Japan .................... 63-334420
Jan. 23, 1989 [JP] Japan ..................... 1-13812

[51] Int. Cl.⁵ .............................. B32B 3/02
[52] U.S. Cl. ............................ 428/64; 428/76; 428/212; 428/913; 369/272; 369/283
[58] Field of Search .............. 428/64, 76, 212; 369/272, 283

[56] References Cited

U.S. PATENT DOCUMENTS

| | | | |
|---|---|---|---|
| 4,461,807 | 7/1984 | Mori et al. | 428/469 |
| 4,786,538 | 11/1988 | Saito et al. | 428/64 |
| 4,847,132 | 7/1989 | Takao et al. | 428/65 |

FOREIGN PATENT DOCUMENTS

| | | |
|---|---|---|
| 61-211853 | 9/1986 | Japan . |
| 62-54854 | 3/1987 | Japan . |
| 62-222443 | 9/1987 | Japan . |
| 63-2131 | 1/1988 | Japan . |
| 63-143254 | 6/1988 | Japan . |

Primary Examiner—Bruce H. Hess
Assistant Examiner—Elizabeth Evans
Attorney, Agent, or Firm—Wenderoth, Lind & Ponack

[57] ABSTRACT

In an optical information recording medium, a protective layer containing a material not reacting with an active layer is disposed, and the composition ratio of this protective layer is designed so as to increase the amount of the material not reacting with the active layer near the border contacting with the active layer, so that degradation of the active layer is prevented. In this construction, the stability is maintained after repetition of recording and erasing cycles over 1 million times.

11 Claims, 1 Drawing Sheet

INFORMATION RECORDING MEDIUM

BACKGROUND OF THE INVENTION

1. Field of the Invention

The present invention relates to an information recording medium capable of recording, reproducing and erasing information by irradiation with laser beam or the like.

2. Description of the Prior Art

The known types of optical disks include the write-once type disk using a thin film of TeOx ($0 < X < 2.0$) mainly composed of Te and $TeO_2$. Besides, chalcogenide alloys (for example, $Te_{85}Ge_{15}$, $Te_{81}Ge_{15}S_2Sb_2$) are known as the materials capable of recording information by heating the thin film with laser beam to melt it and cooling rapidly to amorphize it, and erasing by heating it and cooling slowly to crystallize. Developments of information recording medium capable of recording, reproducing and erasing information by using such materials are being promoted. For the purpose of increasing the thermal stability of the information recording medium, the stability of multiple cycles of recording and erasing, and optical absorption sensitivity or change of reflectivity by making use of the interference effect, protective layers excellent in heat resistance are disposed on both sides of the active layer. When recording information by laser beam on such recording medium, the active layer is preliminarily crystallized, and then irradiated with a laser beam which is intensity modulated corresponding to information and reduced to a beam diameter of about 1 μm to be heated above the melting point of the active layer. After the heated part is cooled rapidly, the information is recorded as an amorphization mark. To erase the recorded information, the active layer is heated by a laser beam and is cooled slowly to crystallize again.

The problem in the information recording medium subjected to the cycle of heating to melt, rapid cooling and amorphizing, and the cycle of heating, slow cooling, and crystallizing is, above all, the variations of the signal quality due to the heating-cooling cycle. Causes of such variations include thermal and mechanical damages to the active layer due to quick repetition of heating and cooling over 400° C. by laser beam irradiation. Besides, when the active layer is heated above the melting point, a chemical reaction occurs between the components in the active layer and the components in the protective layer being in contact therewith, which may cause deterioration of the active layer. As a preventive measure of such deterioration, for example, a protective layer composed of a mixture of chalcogenide compound such as ZnS and ZnSe and oxide such as $SiO_2$ and $GeO_2$ has been proposed in the Japanese Laid-open Patent No. 63-103453.

However, even when such protective layer is provided, in repetition of heating and cooling of over 1 million cycles, the components of the active layer and components of the protective layer react with each other to increase the noise and change the reflectivity, causing deterioration of the recording and erasing cycle characteristic in the order of 1 million cycles.

SUMMARY OF THE INVENTION

It is hence a primary object of the invention to present an information recording medium stable in the repetitive recording and reproducing cycle characteristic of over 1 million cycles.

To achieve the above object, an information recording medium of the invention comprises an active layer for absorbing light to write and erase information, and a protective layer formed at least on one surface of the active layer and having contained therein a material which does not react with the active layer, wherein a composition ratio of said material in the protective layer is higher in an area near a surface contacting with the active layer than in the remaining area.

By this construction, the reaction between the active layer and the protective layer can be prevented.

As a result, even in repetition of recording and erasing of over 1 million cycles, the information recording medium has a stable characteristic free from change in the reflectivity or increase of noise.

DETAILED DESCRIPTION OF THE PREFERRED EMBODIMENTS

Figure 1:
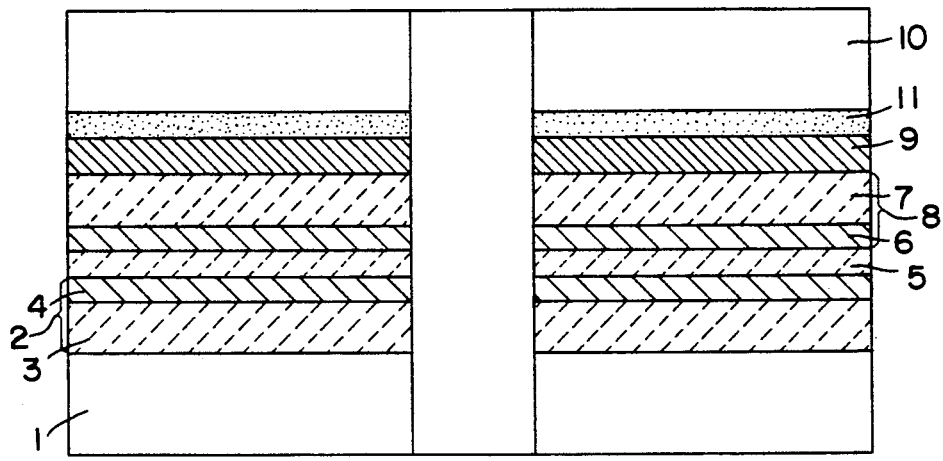
FIG. 1 and FIG. 3 are sectional views each showing a structure of an information recording medium embodying the invention.

In FIG. 1, a substrate 1 may be a polycarbonate or other resin or glass plate having preliminarily formed thereon grooves or pit rows for laser beam guide. A protective layer 2 is formed on a surface of this substrate 1. This protective layer 2 is composed of a dielectric layer 3 and a reaction preventive layer 4. The dielectric layer 3 comprises ZnS mixed with about 20 of $SiO_2$, and it is formed in a thickness of about 1500 A. On the dielectric layer 3, the reaction preventive layer 4 comprising $SiO_2$ is formed in a thickness of about 100 to 200 A. An active layer 5 comprising Te-Ge-Sb is formed on the layer 4 in a thickness of about 200 to 800 A. On the active layer 5, a protective layer 8 composed of a reaction preventive layer 6 and a dielectric layer 7, same as the protective layer 2, is formed. Moreover, in order to enhance the sensitivity, a reflective layer 9 comprising Ni-Cr may be formed on the protective layer 8 in a thickness of about 400 A. Each of these layers can be formed by the vacuum deposition or sputtering method. It is preferable, in order to protect the thin film, to provide on the reflective layer 9 a protective substrate 10 with an adhesive 11.

The refractive index of $SiO_2$ is 1.46. When the protective layer is composed of a material high in the content of $SiO_2$, which is small in the refractive index, it is difficult to increase the optical absorption sensitivity of the recording medium or the change of the reflectivity by utilizing the interference effect. On the other hand, to increase the interference effect, the content of ZnS having a high refractive index of 2.4 may be increased, but when the content of ZnS becomes larger, the characteristic of the recording thin film deteriorates probably due to reaction of the active layer with free S or free Zn contained in ZnS.

However, in this embodiment, reaction of the active layer 5 with the dielectric layers 3, 7 can be prevented by disposing the thin reaction preventive layers 4, 6 comprising $SiO_2$ between the active layer 4 and the dielectric layer 2, and between the active layer 5 and the dielectric layer 7. Besides, a sufficient interference effect can be obtained by the dielectric layers 3, 7 high in ZnS content.

Figure 2:
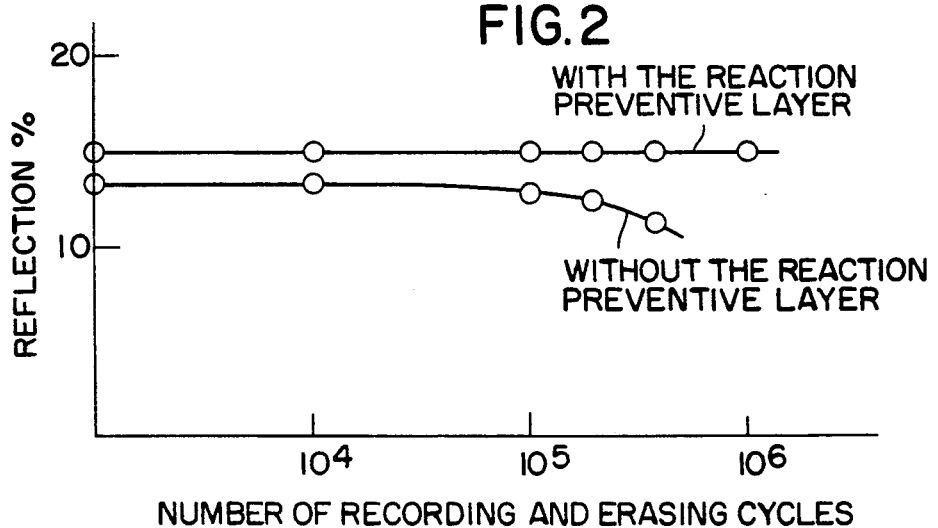
FIG. 2 is a cycle characteristic diagram of an information recording medium of an embodiment of the invention.

In order to prove the effects of the structure of the information recording medium of the invention, an information recording medium in the structure shown in FIG. 1, and an information recording medium in the structure without the reaction preventive layers 4, 6 in FIG. 1 were produced and evaluated in the following conditions. Each information recording medium was formed into a disk of 130 mm in diameter, and was rotated at 1800 rpm, and an overwriting characteristic of a signal of f1 = 3.43 MHz and a signal of f2 = 1.0 MHz was measured. The overwriting is a technique of simultaneous erasing and recording, by the power modulation of high power level and low power level, using a laser beam reduced to a circle spot of about 1 μm, for forming and recording an amorphization mark at the high power level, and erasing by crystallizing the amorphization mark at the low power level. In this evaluation, the the high power level was set at 13 mW, and the low power level, at 7 mW. FIG. 2 shows recording-erasing cycle characteristic of the individual information recording media. As clear from FIG. 2, in the recording medium without the reaction preventive layers 4, 6, the reflection began to drop after about 100,000 cycles, but the recording medium with the reaction preventive layers 4, 6 showed no drop of reflection even after 1 million cycles. That is, deterioration due to reaction of the active layer 5 with the dielectric layers 3, 7 does not occur owing to the barrier effect of the reaction preventive layers 4, 6, and an information recording medium with stable characteristic was obtained even by repetition of recording and erasing of more than 1 million cycles.

Meanwhile, in this embodiment, SiO$_2$ was used in the reaction preventive layers 4, 6, but as a result of further continuation of experiment, similar results as in the structure having the protective layers made of SiO$_2$ as shown in FIG. 2 were obtained by using, as the reaction preventive layer material, an oxide such as Ta$_2$O$_5$, TiO$_2$, Al$_2$O$_3$, MgO, WO$_3$ and SnO$_2$, a nitride such as AlN, SiN, Si$_3$N$_4$, TiN and ZrN or a carbide such as SiC, TiC, WC and ZrC. Besides, in the foregoing embodiment, ZnS-SiO$_2$ was used as the dielectric layer material and Ge-Te-Sb as the active layer material, but these are not limitative in the invention. For example, the dielectric layer may be also comprised by a material selected from chalcogenide alloys including ZnSe, ZnTe, PbS, PbSe and PbTe, or a mixture of such chalcogenide with oxide, nitride or carbide, and the active layer may be made of an alloy such as Ge-Te and Sb-Te, or their mixture, or a chalcogenide alloy comprising a mixture of Ge-Te or Sb-Te with Te, Ge or Sb.

Figure 3:
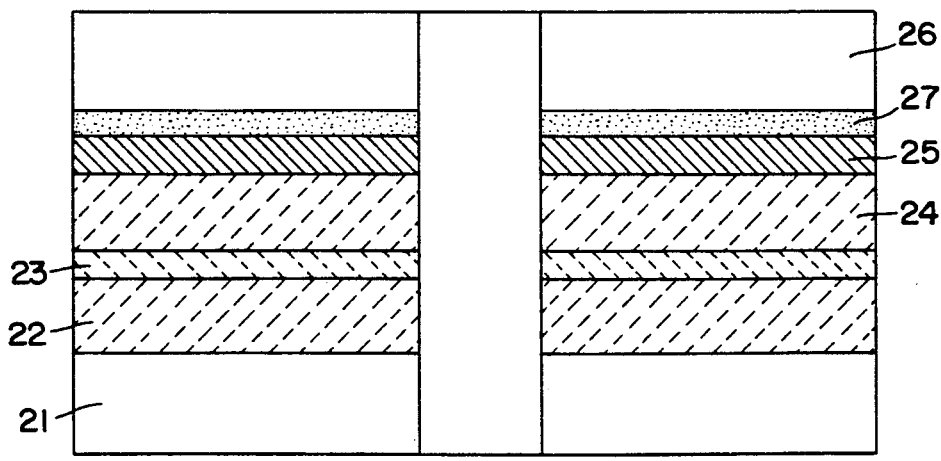

Another embodiment of the invention is described below. In FIG. 3, on a surface of a substrate 21 which is the same as in the preceding embodiment, a protective layer 22 mainly composed of ZnS as chalcogenide of metal, and SiO$_2$ as a material which does not form a solid solution with this chalcogenide is formed in a thickness of about 1500 A. The composition ratio of the protective layer 22 is varied in the direction of the film thickness. That is, the composition ratio of the protective layer 22 in the area near the border with an active layer 23 to be formed thereon is controlled so that the rate of SiO$_2$ may be 90% or more, and the rate of SiO$_2$ is decreased on going away from the active layer 23. Near the border with the substrate 21, the content of SiO$_2$ may be about 20%. On the protective layer 22, the active layer 23 comprising Te-Ge-Sb is formed in a thickness of about 200 to 800 A. On the active layer 23, a protective layer 24 containing SiO$_2$ in the same way as the protective layer 22 is formed in a thickness of about 1500 A. Furthermore, in order to enhance the sensitivity, a reflective layer 25 comprising Ni-Cr may be formed in a thickness of about 400 A. As the thin film forming method, the vacuum deposition or sputtering method can be employed. It is preferable to provide on the layer 25 a protective substrate 26 with an adhesive 27. When the thus composed information recording medium is subjected to repetition of recording and erasing as in the foregoing embodiment, the active layer is subjected to rapid and repeated heating and cooling over 400° C. In consequence, the protective layers 12, 14 are also heated and cooled repeatedly.

When the protective layer is structured in multi-layers of different compositions, strains are caused due to difference in the coefficient of linear expansion, and a discontinuous stress takes place. In particular, since the protective layer is made of highly brittle material such as ZnS and SiO$_2$, cracks are likely to be formed by repetition of heating and cooling for several million times, which may cause increase of noise.

In this embodiment, since the composition ratio of ZnS and SiO$_2$ of each of the protective layers 22, 24 changes continuously, the strain is lessened, and fatigue failure hardly takes place. Furthermore, since the content of SiO$_2$ is set particularly high near the surface of the protective layer contacting the active layer 23, reaction between the active layer 23 and the protective layers 22, 24 can be prevented. As a result, even after several million times of repeated recording and erasing, neither increase of noise nor change of reflectivity is found, and an information recording medium of stable characteristic is obtained.

Meanwhile, in this embodiment, as the materials for the protective layers 22, 24, ZnS and SiO$_2$ were used, but the invention is not limited to them alone. As the material of the metal chalcogenide, ZnSe, ZnTe, PbS, PbSe or PbTe may be used, aside from ZnS. As the material which does not form a solid solution with the metal chalcogenide, aside from SiO$_2$, an oxide such as Ta$_2$O$_5$, TiO$_2$, Al$_2$O$_3$, MgO, WO$_3$ and SnO$_2$, a nitride such as AlN, SiN, Si$_3$N$_4$, TiN and ZrN, or a carbide such as SiC, TiC, WC and ZrC may be used. As the recording layer, alloys such as Ge-Te and Sb-Te, or their mixture, or their mixture with chalcogenide alloy mixed with Te, Ge or Sb may be used.

What is claimed is:

1. An information recording medium comprising an active layer for absorbing light to write and erase information, and a protective layer formed at least on one surface to the active layer and mainly composed of a metal chalcogenide and a material which does not react with the active layer, said material comprising at least one oxide selected from the group consisting of SiO$_2$, Ta$_2$O$_5$, TiO$_2$, Al$_2$O$_3$, MgO, Wo$_3$ and SnO$_2$ or at least one nitride selected from the group consisting of AlN, Si$_3$N$_4$TiN and ZrN or at least one carbide selected from the group consisting of SiC, TiC, WC and ZrC, and wherein said material is present at 90% or more in an area near the border contacting the active layer and is present at at least 20% in the other areas.

2. The information recording medium according to claim 1, wherein the metal chalcogenide is a zinc chalcogenide.

3. The information recording medium according t claim 2, wherein the zinc chalcogenide comprises at least one member selected from ZnS, ZnTe and ZnSe.

4. The information recording medium according to claim 1, wherein the metal chalcogenide is a lead chalcogenide.

5. The information recording medium according to claim 4, wherein the lead chalcogenide comprises at least one member selected from PbS, PbTe and PbSe.

6. The information recording medium according to claim 1, wherein the active layer comprises a chalcogenide alloy.

7. The information recording medium according to claim 6, wherein the chalcogenide alloy comprises at least one member selected from Ge-Te, Sb-Te and Ge-Te-Sb.

8. The information recording medium according to claim 1, wherein the amount of the material not reacting with the active layer is 90% or more in the area near the border contacting with the active layer.

9. The information recording medium according to claim 1, wherein the composition ratio of the material not reacting with the active layer in the protective layer increases continuously as approaching the active layer.

10. The information recording medium according to claim 1, wherein the protective layer comprises a reaction preventive layer formed on the active layer and comprising the material which does no react with the active layer, and a dielectric layer formed on the reaction preventive layer and comprising an halcogenide alloy selected from the group consisting of ZnS, ZnSe, ZnTe, PbS, PbSe and PbTe or a mixture of said chalcogenide alloy with an oxide, a nitride or a carbide.

11. The information recording medium according to claim 10, further comprising a reflective layer formed on the dielectric layer.

* * * * *